Aug. 3, 1954
N. E. HART
2,685,222
WEIGHING SCALE LENS FRAME TILT CONTROL
Filed Dec. 28, 1950
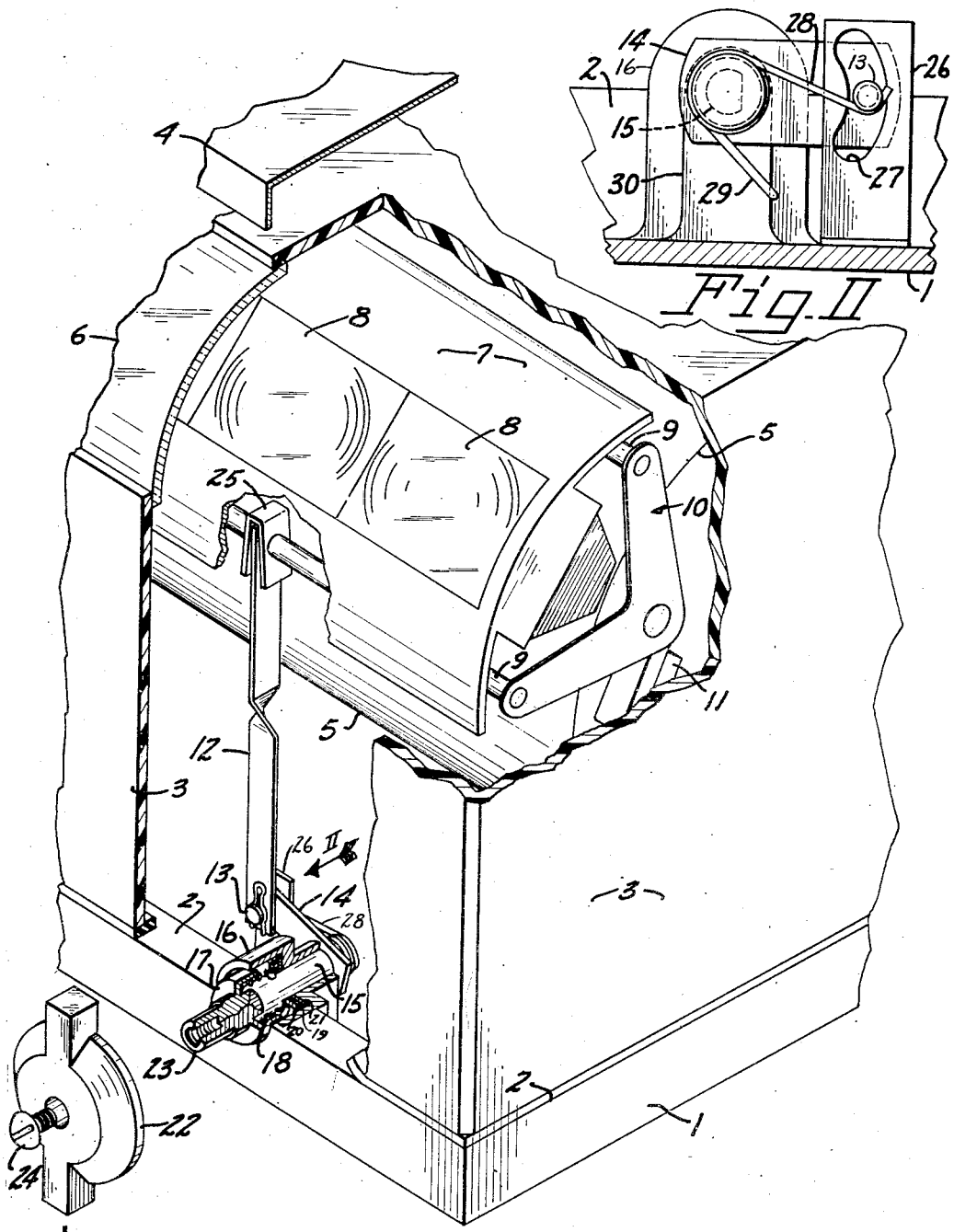
Fig. I
Fig. II
Inventor
Norman E. Hart
By Marshall and Marshall
Attorneys Patented Aug. 3, 1954

2,685,222

UNITED STATES PATENT OFFICE 2,685,222

WEIGHING SCALE LENS FRAME TILT CONTROL

Norman E. Hart, Toledo, Ohio, assignor to Toledo Scale Company, Toledo, Ohio, a corporation of New Jersey Application December 28, 1950, Serial No. 203,126

1 Claim. (Cl. 88—1)

This invention relates to weighing scales in which a magnifying lens assembly is mounted in front of the reading line of the scale and which mechanism is provided for tilting or rocking the lens frame to facilitate reading the scale.

While scales have been built in which the lens frames are tiltable to facilitate reading, the constructions employed are awkward and are susceptible to damage from rough usage. Much of the damage occurs because the stops which limit the travel of such a lens frame engage a portion of the frame remote from the driving mechanism thus subjecting the frame to the maximum force that may be applied through the drive mechanism. As a result the lens frame is twisted or otherwise damaged if the user attempts to drive it beyond fixed limits.

The principal object of this invention is to provide mechanism for tilting the lens frame of a scale, which mechanism is itself limited as to travel and which may be easily engaged or disengaged from the frame during assembly or repair.

Other objects and advantages are apparent from the following description of a preferred embodiment of the invention illustrated in the accompanying drawings.

In the drawings:

Figure I is an isometric view, with parts broken away and other parts shown in section, of a portion of a weighing scale showing the lens tilting mechanism.

Figure II is a fragmentary elevation of the lens elevating mechanism and stops as seen from the direction of the arrow II of Figure I.

These specific figures and accompanying description are intended merely to illustrate the invention but not to impose limitations on its scope.

A weighing scale embodying the invention comprises a base 1 having an upstanding wall 2 on which a housing 3 is mounted. A load counterbalancing mechanism (not shown) is contained within the housing 3 and serves to support a load receiver 4 and to rotate an indicia bearing chart 5 through equal angles for equal increments of load applied to the load receiver 4. The housing 3 of the scale is provided with a window 6 beneath which a lens holder 7 is located to position lenses 8 with respect to the reading line of the chart 5 so that enlarged images of the indicia are exhibited to a user of the scale. The lens holder 7 is slidably mounted on a pair of rods 9 forming part of the lens frame 10 which in turn is pivotally mounted from a standard 11 so that the frame 10 and holder 7 may rotate about an axis that is aligned with the reading line of the scale.

The lens frame 10 is held in position by a strut 12 the upper end of which engages the lower one of the rods 9 while the lower end of the strut 12 is carried on a pin 13 extending laterally from an arm 14 mounted on a control shaft 15. The control shaft 15 is journaled in a boss 16 formed in the wall 2 of the base 1. The control shaft 15 has a coaxial cup portion 17 that houses a helical compression spring 18 constituting part of a friction brake 19 that opposes rotation of the control shaft 15 in the boss 16. The friction brake 19 includes a stationary face 20 fixed in the boss and a moving shoe or washer 21 keyed or otherwise nonrotatably but slidably attached to the control shaft 15. Friction material is interposed between the fixed member 20 and the rotatable washer or shoe 21. The spring 18 provides the force holding the brake members together.

A knob 22 fits over an end 23 of the control shaft 15 and is secured thereto by a screw 24. Preferably the end of the control shaft 15 is provided with a flat segment and the control knob 22 with a corresponding noncircular bore so that the control knob cannot turn on the shaft 15.

The upper end of the strut 12 engages the rod 9 of the lens frame 10 and is held in position thereon by a V-shaped clip 25 that straddles the end of the strut 12 and that having the rod fitting through holes in its ends locks itself against movement along the rod. The clip 25 is unlocked for movement by pinching its free ends together and sliding it along the rod. When the ends are released the ends attempt to spread and thus lock the clip 25 to the rod.

Referring now to Figure II, the arm 14 carried on the inner end of the control shaft 15 is located adjacent to a slotted bracket 26 erected from the base 1. The pin 13, which on one end carries the strut 12, extends through the arm 14, through a slot 27 in the bracket 26, and its end is engaged by an end of a spring 28 tending to force the arm 14 to its upper limit of travel. The amount of travel is limited by the length of the slot 27 in the bracket 26. The spring 28 is loosely coiled around the inner end of the control shaft 15 and its other end 29 is hooked behind an inwardly directed boss 30 of the wall 2. The spring 28 is selected so that its force is just sufficient to counterbalance the off-center weight of the lens frame 10, lenses 8 and lens holder 7. The friction brake 19 offers sufficient frictional force to hold the control shaft and arm in adjusted position even though the spring force of the spring 28 does not exactly balance the weight of the lens assembly.

This construction is extremely simple and provides positive limits of travel for the lens frame assembly without subjecting that assembly to excessive force even though the operator attempts to force the mechanism beyond its limit of travel. This follows because the ends of the slot 27 fix the limits of travel and the bracket 26 is strong enough to withstand all of the force that may be applied through the control knob 22.

When it is desired to tilt the lens frame 10 to accommodate the position of the lenses 8 to the height of the operator's eye level, the operator turns the knob 22 that is located exteriorly of the housing 3 and wall 2, thus rocking the control shaft 15 to a new position in which it is held by the functioning of the friction brake 19.

The arm 14 being fixed to the control shaft 15, turns with it to lift or lower the strut 12 which pushes the lower rod 9 upwardly or pulls it downwardly to tilt the lens frame 10 and thus move the lenses 8 into the desired new position.

Should a tall person attempt to swing the lenses 8 beyond the limit of upward travel permitted by the space within which the lens frame is located, the pin 13 will engage the upper end of the slot 27 in the bracket 26 and thus prevent the arm 14 from swinging upwardly far enough to force the lens frame 10 against adjacent elements. Downward movement of the arm 14 is similarly limited by engagement of the pin 13 at the lower end of the slot 27.

The tendency of the lens frame 10 and the parts carried thereby to swing downwardly because of their weight is counteracted by the action of the spring 28.

When it is desired to remove the lens frame assembly 10 the strut 12 is disengaged from the pin 13 after the arm 14 has been turned to the upper end of its travel. The control shaft 15, arm 14 and spring 28 are thus held in operative position even though the pin 13 is relieved of the weight of the lens frame.

Various modifications in specific details of construction may be made without departing from the spirit and scope of the invention.

Having described the invention, I claim:

In a weighing scale having a rockable lens frame equipped with lenses for providing enlarged images of indicia, pivot means aligned with a reading line of the scale for guiding the rockable lens frame for limited rotation about the reading line, and control means for positioning and supporting the rockable frame comprising, in combination, a base for the scale, an operating shaft journaled in a wall of the base, a laterally extending arm fixed to the interior end of the shaft, a link pivotally connected to the free end of the arm and operatively connected to the rockable lens frame, resilient means operatively connected between the arm and the base adapted to counterbalance the force of gravity on the lens frame transmitted to the arm, and a member mounted on the base and engaging the arm for limiting its range of movement.

References Cited in the file of this patent

UNITED STATES PATENTS

| Number | Name | Date |
| --- | --- | --- |
| 1,609,292 | Burch | Dec. 7, 1926 |
| 2,013,939 | Williams | Sept. 10, 1935 |
| 2,366,947 | Williams | Jan. 9, 1945 |
| 2,385,881 | Peterson | Oct. 2, 1945 |
| 2,554,312 | Prince | May 22, 1951 |
| 2,560,169 | Gradisar | July 10, 1951 |
| 2,563,702 | Benford | Aug. 7, 1951 |